I. R. Amsden,
Hydrostatic Scale.
Nº 93,158.     Patented Aug. 3, 1869.
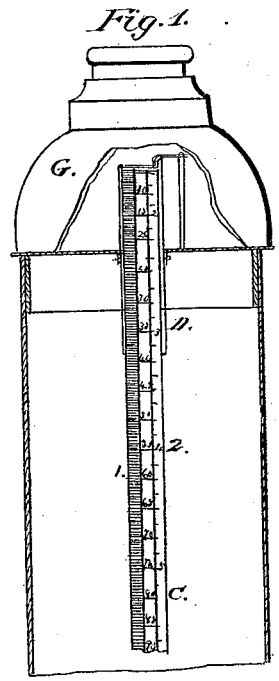
Fig. 1.
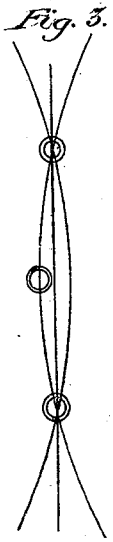
Fig. 3.
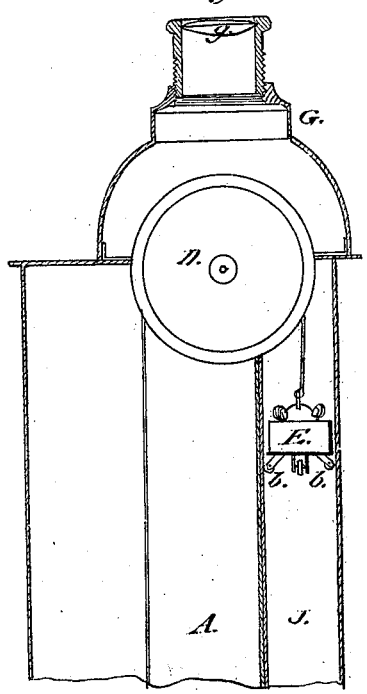
Fig. 2.
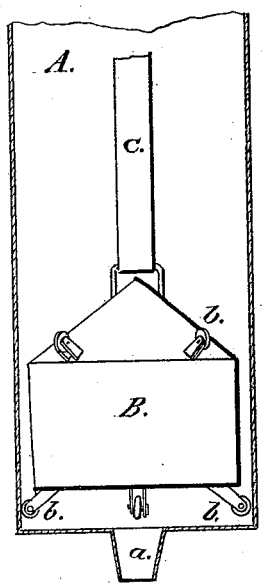
Fig. 4.
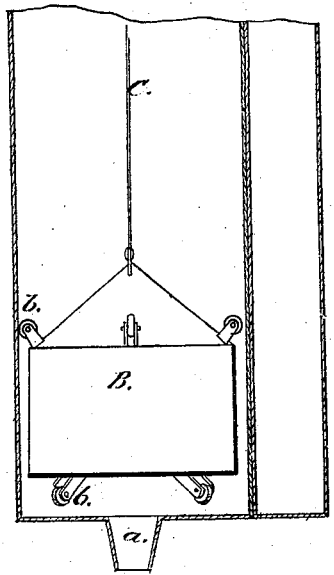
Fig. 5.
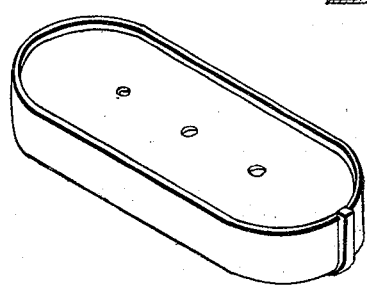
Witnesses:
R. A. Davis
Geo. W. Miatt
Inventor:
Ira R. Amsden
By J. Fraser & Co.
Attys.

United States Patent Office.

IRA R. AMSDEN, OF BUFFALO, NEW YORK.

Letters Patent No. 93,158, dated August 3, 1869.

---

IMPROVEMENT IN HYDROSTATIC SCALE FOR TONNAGE OF VESSELS.

---

The Schedule referred to in these Letters Patent and making part of the same.

---

*To all whom it may concern:*

Be it known that I, IRA R. AMSDEN, of the city of Buffalo, in the county of Erie, and State of New York, have invented certain new and useful Improvements in Hydrostatic Scales, and the method of applying the same to a boat or vessel; and I do hereby declare that the following is a full and exact description thereof, reference being had to the accompanying drawings, making part of this specification, in which—

Figure 1 is a central vertical section of my improved scale.

Figure 2, a similar section, at right angles to fig. 1.

Figures 3, 4, and 5, diagrams, illustrating the method of applying two or more of the scales to a boat or vessel.

Like letters of reference indicate corresponding parts in all the figures.

My invention consists in the construction and arrangement of the scale itself, and the method of ascertaining the dead-point or centre of gravity of a boat or vessel, and the particular application of two or more of the scales thereto.

In all hydrostatic scales heretofore in use, so far as I am aware, but two methods have been employed to indicate the tonnage: first, by a stiff stem attached to the float, graduated by a scale, which stem extends up through the deck, as shown in the patents of Amory Amsden and William O. Reim; and, second, by a non-graduated cord or connection, passing from the float, over a pulley, and attached to a counter-weight, by which an indicating-mechanism, with hands and dial-plate, is made to record the tonnage, as covered by patent to myself, dated October 29, 1867.

In the first case, as above stated, the stem being stiff and rigid, and extending through the deck, occupies much space, and interferes with the deck-room. In the second case, though this objection is avoided, there is the expense of complicated machinery in the dial-arrangement, which might be deemed objectionable.

In my present invention, I design to avoid these difficulties, by the employment of a graduated flexible connection or strap, passing from the float, over a pulley, and having a counterweight attached, as hereinafter set forth.

In the drawings—

A indicates the cylinder, corresponding with those already known, having a nozzle, *a*, which passes through the bottom of the boat or vessel, to admit the water to the cylinder.

The float B rests in the cylinder in the usual way, having attached thereto a flexible connection or strap, C, which passes upward over pulley D, and has secured to the reverse end the counterweight E, that keeps the strap taut as it moves up and down.

I provide both the float and the counterweight with friction-rollers $b, b, b, b$, running upon the sides of the enclosing-tubes, to avoid friction.

The connection or strap C is preferably flat, and may be made of leather, cloth, metal, or any other material which will or can be made to answer the purpose.

On one side of the face of this strap is marked a scale, 1, which indicates, in pounds, the tonnage of the boat or vessel; and on the other side of this face, another scale, 2, which indicates, in feet and inches, the draught, or the depth to which the boat or vessel sinks. If desired, but one side of the face of the strap may be marked, and it may be either to indicate tonnage or draught.

A stationary pointer or index-hand, *f*, is made to rest over the top of the strap C, for noting and subdividing the spaces thereon as it passes underneath; and one or more lenses are attached to the cover G, above, fixed or adjustable, which magnify the graduation of the scales, and thereby indicate, with greater exactness, the amount of tonnage or draught.

The special point of novelty in this connection is the graduated strap C. By its employment, I place the apparatus in the simplest and most compact form, and always ready for use. I thus avoid the stiff stem or rod that passes up through the deck, as in the cases before referred to; and I also avoid the registering-apparatus with dial-plate and hands, as in my own patent of October 29, 1867. Where the stiff stem is employed, the projection of the same through the deck interferes with the deck-room. When forced down below the deck, to be out of the way, the float attached resting below the surface of the water, collects sediment, which not only interferes with the free action of the float, but adds weight, which affects the correctness of indication.

In my new apparatus, I do not necessarily run the strap above the deck, and, therefore, obviate these difficulties, and by the graduation upon the strap, I avoid the registering-dial. In addition to this, for convenience, the strap may be run to any part of the boat without difficulty.

In this connection, also, the magnifying-lens is of the utmost importance, as it enables me, to a certainty, to tell the exact registration. This lens is made adjustable, if desired, by means of a screw, or otherwise, so as to adjust the focal length.

Heretofore, the graduation on the stem or dial has indicated but a single measurement, either in tonnage or draught; but by making the two graduations upon the same strap, as above described, I am enabled to indicate both measurements in the same device, and by the simplest means.

In Amsden's patent of 1838, two scales are located, one at each end of the midship; and in Reim's patent, before referred to, two scales are employed, each located midway between the dial-centre and the ends of the boat. By experiment, I have determined that these methods are both wrong, as these positions prevent the correct indicating by average of the weigh To avoid this difficulty, I locate two or more of the scales equidistant from the dead-point or centre of gravity of the boat, without reference to the ends, as indicated in fig. 4.

The centre of gravity may or may not be the lineal centre of the boat. To find this dead-centre, I employ the following method:

I temporarily locate, on the outside of the vessel, between the ends, and as nearly opposite the dead-point as can be estimated, one of my scales. I then place upon the estimated dead-centre a given weight, say ten tons. I then note the depression of the boat upon the scale or strap. I then shift the weight from the first position to a second and third, nearer the ends. If the depression of the boat, as indicated by the scale, is the same in all, the dead-centre has been found, and may be marked. But if any variation is found, the position of the scale is changed, and the test proceeded with as before, until the dead-centre is found. When found, the scale is there permanently located, and the scale or strap graduated in the usual way. Then, if it is desired to use more, I take copies of that graduation, and locate two or more of the scales equidistant from the central one, as before described. The location of the three is indicated in fig. 5.

The employment of three scales, one at the dead-point, and the other two equidistant from the same, enables me to avoid the difficulty in arriving at the true tonnage in case of any "hogging" or sagging of the boat, from age or weakness. In the absence of this weakness, one scale at the dead-centre is deemed sufficient and preferable. In Reim's patent two scales are employed for the same purpose, but as he has not a third one at the dead-centre, the object is not attained. For instance, if ten tons are placed on a weak vessel, causing it to bend upward at the centre, say half an inch, (or two tons in measurement,) and downward midway between the centre and ends, one-quarter of an inch, (or one ton in measurement,) the three scales would then indicate as follows: Eight tons on the centre one, and eleven tons on each of the other two equidistant from the centre one, (if the boat be on even keel,) or an aggregate of thirty tons on the three scales, the average of which is ten tons, or the true tonnage, while with only the two scales we have twenty-two tons, the average of which is eleven tons, or one ton too much.

I have also ascertained, by experiment, that two scales will not indicate the correct tonnage on sound boats that do not "hog," unless they are placed equidistant from the dead-centre of the boat; in fact, that the dead-centre is the point from which to measure, without any regard to the ends, in locating two scales, or some multiple of two. And whenever two, or a multiple of two, scales are used for any purpose on a boat, one at the dead-centre will be of great use, for the purpose of always showing the correct tonnage or the true average of all, (provided the cargo has not changed the form of the boat, or caused it to hog,) and thus avoiding any chance of error in figuring the average indications of the other scales, which is very liable to occur.

What I claim as my invention, and desire to secure by Letters Patent, is—

1. The cylinder or case A, connected with the outside water through the boat or vessel, and divided into two separate chambers, A and J, when the same or other equivalent device is combined with the float B, graduated strap C, and counterweight E, in such a manner as to separate said float and weight, and allow each a free and independent action, substantially in the manner and for the purpose herein specified.

2. The cylinder A, divided into two chambers, one of which, A, opens into the water through the bottom of the boat, and the other chamber, J, is entirely free from contact with water, either inside or outside of the boat, and said cylinder receives a float, B, and counterweight, E, which are separated from each other, but connected by the graduated strap C, and all adapted to operate as set forth.

3. In combination with two or more scales, set on opposite sides of the dead-centre, the employment of a single scale at the dead-centre, in the manner and for the purpose specified.

4. In combination with the float B and counterweight E, the friction-rollers $b$ $b$, arranged and operating as and for the purpose described.

In witness whereof, I have hereunto signed my name, in the presence of two subscribing witnesses.

IRA R. AMSDEN.

Witnesses:
F. A. DAVIS,
R. F. OSGOOD.